United States Patent [19]

Desurvire et al.

[11] Patent Number: 5,027,079
[45] Date of Patent: Jun. 25, 1991

[54] ERBIUM-DOPED FIBER AMPLIFIER

[75] Inventors: Emmanuel Desurvire, Middletown; Clinton R. Giles, Holmdel; John L. Zyskind, Shrewsbury, all of N.J.

[73] Assignee: AT&T Bell Laboratories, Murray Hill, N.J.

[21] Appl. No.: 560,664

[22] Filed: Jul. 31, 1990

Related U.S. Application Data

[63] Continuation-in-part of Ser. No. 467,699, Jan. 19, 1990, abandoned.

[51] Int. Cl.[5] .......................... H01S 3/30; G02B 6/26
[52] U.S. Cl. .............................. 330/4.3; 372/6; 372/70; 350/96.29; 350/96.34
[58] Field of Search ............... 330/4.3; 372/6, 7, 40, 372/70; 455/610; 350/96.29, 96.34

[56] References Cited

U.S. PATENT DOCUMENTS

| | | | |
|---|---|---|---|
| 3,949,319 | 4/1976 | Tofield et al. | 330/4.3 |
| 4,205,901 | 6/1980 | Ramsay et al. | 350/96.31 |
| 4,447,127 | 5/1984 | Cohen et al. | 350/96.33 |
| 4,525,027 | 6/1985 | Okamoto et al. | 350/96.30 |
| 4,637,025 | 1/1987 | Snitzer et al. | 372/6 |
| 4,733,940 | 3/1988 | Broer et al. | 350/96.31 |
| 4,782,491 | 11/1988 | Snitzer | 372/6 |
| 4,804,259 | 2/1989 | Sasaki et al. | 350/96.34 |

FOREIGN PATENT DOCUMENTS 283748  9/1988  European Pat. Off.
0176944 11/1985 Japan.

OTHER PUBLICATIONS

Desurvire et al., "Efficient Erbium-Doped . . . Power"; Opt. Lett., vol. 14, #22, 11/15/89, pp. 266-268.
Barnes et al., "High-Quantum-Efficiency . . . 980 nm"; Opt. Lett., vol. 14, #18, 9/15/89. pp. 1002-1004.
Desurvire et al., "High-Gain . . . Fiber Amplifier"; Opt. Lett., vol. 12, #11, 11/87, pp. 888-890.
Laming et al., "Pump Excited-State . . . Fibers"; Opt. Lett., vol. 13, #12, 12/88, pp. 1084-1085.

Primary Examiner—Nelson Moskowitz
Attorney, Agent, or Firm—Eli Weiss

[57] ABSTRACT

This invention relates to an Erbium doped fiber amplifier having improved operating characteristics. Parameters which determine the operating characteristics of an erbium doped fiber amplifier are the concentration of erbium in the core of a fiber; the ratio of the radius of the core of the fiber doped with erbium relative to the radius of the core of the fiber, and, the length of the fiber. It is now recognized that improved fiber amplifier performance can be obtained by varying the core-cladding refractive index difference of the fiber. The various parameters are here defined for providing an erbium doped fiber amplifier having optimum gain characteristics.

22 Claims, 12 Drawing Sheets

ERBIUM-DOPED FIBER AMPLIFIER

This application is a continuation-in-part of U.S. patent application Ser. No. 467,699 filed on Jan. 19, 1990, now abandoned.

TECHNICAL FIELD

This invention relates generally to fiber amplifiers and more particularly to erbium-doped fiber amplifiers having improved operating characteristics.

BACKGROUND OF THE INVENTION

There is considerable interest in using rare earth doped fiber amplifiers to amplify weak optical signals for both local and trunk optical communications networks. The rare earth doped optical amplifying fibers are found to have low cost, exhibit low-noise, provide relatively large bandwidth which is not polarization dependent, display substantially reduced crosstalk problems, and present low insertion losses at the relevant operating wavelengths which are used in optical communications. Contemplated rare earth doped optical fiber amplifiers can be coupled end-to-end to a transmission fiber and transversely coupled, through a directional coupler, to a laser diode pump. The directional coupler is designed to have a high coupling ratio at the pump wavelength and a low coupling ratio at the signal wavelength so that maximum pump energy is coupled to the amplifier with minimal signal loss. When the amplifying medium is excited with the pump laser, signal light traversing the amplifier experiences a gain. The pump energy may be made to propagate either co-directionally or contra-directionally relative to the signal energy, depending upon whether any remaining unconverted pump light can be more conveniently filtered at the transmitter or the receiver.

A complicating factor in the design of rare earth doped optical amplifiers involves the difference between the various parameters necessary to optimize the performance of the amplifier and those necessary to optimize the performance of the associated transmission fibers. These differences, which arise from the different functions performed by the optical amplifier and the transmission fiber, result in significant signal loss as the signal is transmitted from the transmission fiber to the amplifying fiber, and therefore place a premium on the efficiency of the amplifying fiber which restores the signal to its previous levels. In the transmission fiber, waveguide dispersion must be minimized in order to maximize bandwidth and minimize loss, thereby maximizing the spacing between repeaters. However, in the amplifying fiber, as opposed to the transmission fiber, the major concern involves high gain, high saturation power, and low noise. Exemplary signal losses which can occur because of the different optimal parameters for the transmission and amplifying fibers are splicing losses due to mode mismatch because the signal mode size may be significantly different for the two fibers.

To date, erbium fiber amplifiers appear to have the greatest potential for the high amplification necessary to overcome the signal losses due not only to normal signal processing but also to the mismatch which can occur between a tansmission fiber and an amplification fiber. Erbium doped fiber amplifiers operate at $\lambda = 1.53$ $\mu$m which is of particular interest for optical communication systems because this lasing transition falls into the low-loss window of fiber optic communications. In addition, at this wavelength region, the amplifiers exhibit low insertion loss, broad gain bandwidth (approximately 30 nm) and gain which is not polarization sensitive. A solution to the problem of establishing and fixing the various parameters for providing an erbium-doped fiber amplifier which operates in a most efficient mode is required.

SUMMARY OF THE INVENTION

This invention relates to an Erbium doped fiber amplifier having improved operating characteristics. Parameters which determine the operating characteristics of an erbium doped fiber amplifier are the concentration of erbium in the core of a fiber; the ratio of the radius of the core of the fiber doped with erbium relative to the radius of the core of the fiber, and, the length of the fiber. It is now recognized that improved fiber amplifier performance can be obtained by varying the core-cladding refractive index difference of the fiber. The various parameters and their relationship relative to each other are here defined for providing an erbium doped fiber amplifier having optimum gain characteristics.

DETAILED DESCRIPTION

Rare earth doped fibers for amplifying weak signals for both local and trunk optical telecommunications networks are of particular interest because of their low insertion loss, broad gain bandwidth and polarization insensitive gain. In use, the doped optical fiber is normally transversely coupled to a pump so that a weak optical input signal at some wavelength within the rare earth gain profile experiences a desired amplification. Pump light which can be coupled into the optical fiber via a directional coupler may propagate either co-directionally or contra-directionally within the fiber relative to the signal. The directional coupler can have a high coupling ratio at the pump wavelength and low coupling ratio at the signal wavelength.

When the fiber is not pumped, the signal experiences loss due to ground state absorption by the rare earth ions. As the pump power that is applied to the fiber is increased, the loss due to ground level absorption decreases (i.e., gain is negative but increasing) until, at some value of pump power, there is no net signal absorption (i.e. the gain is zero). This is referred to as the transparency state. Thereafter, as the pump power in the fiber is increased, a higher proportion of rare earth ions are in their excited state and the stimulated emission from the upper lasing state to the ground state becomes stronger than the absorption from the ground state to the upper lasing state, which results in a net positive gain at various wavelengths. Thus, the optical amplifier, when pumped so as to populate the upper lasing level, produces a net positive gain above the pump threshold level and the fiber acts as an amplifier.

Figure 1:
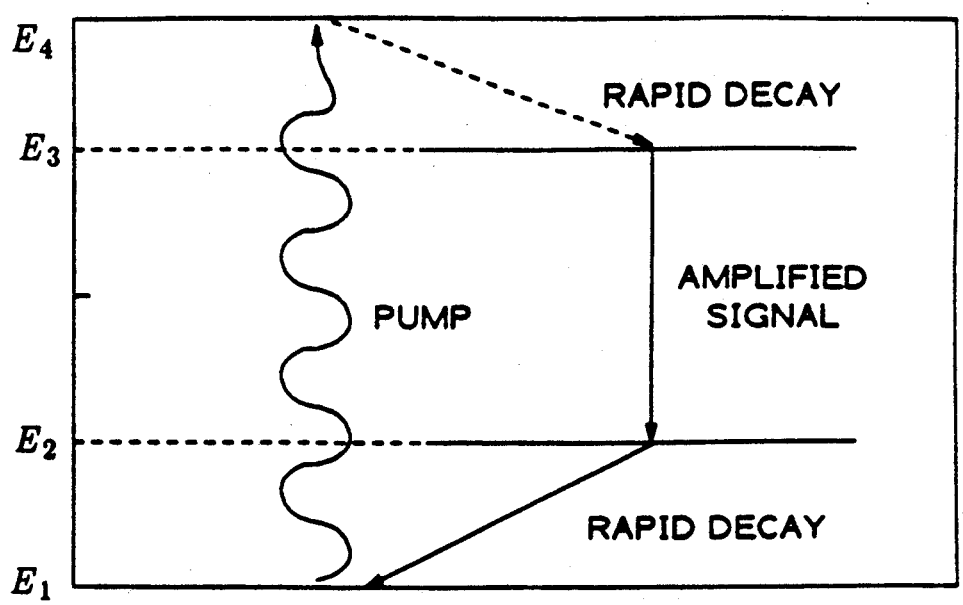
FIG. 1 is an energy level diagram showing population invention and lasing for a non-semiconductor four level system.
Figure 2:
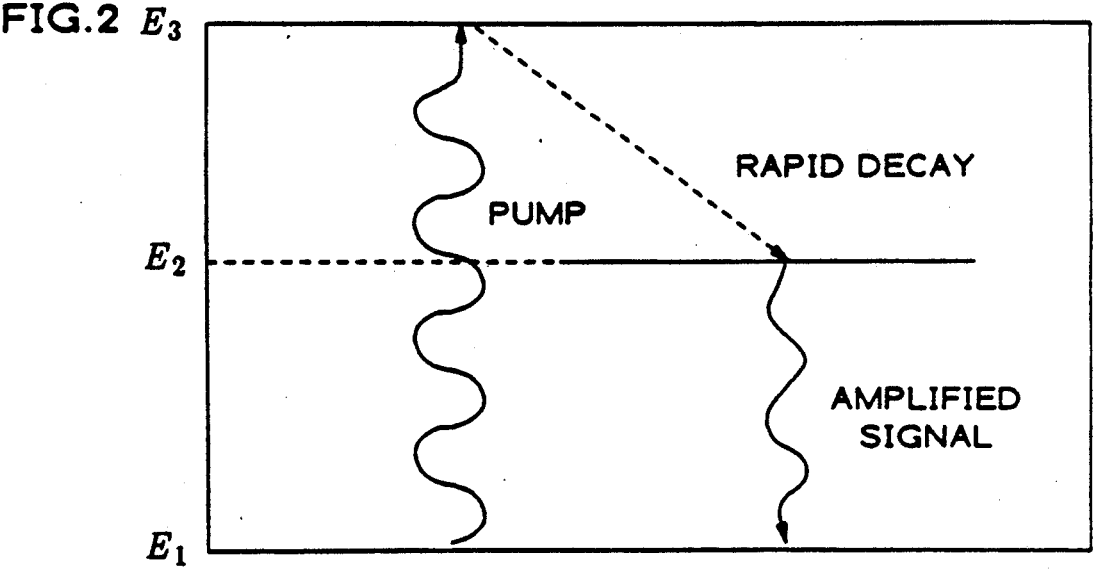
FIG. 2 is an energy level diagram showing population inversion and lasing for a non-semiconductor three level system; such as the erbium laser system.

There are two basic types of optical amplifiers. One type operates with a 4 level lasing system and the other operates with a 3 level lasing system. FIG. 1 illustrates a 4 level lasing system and FIG. 2 illustrates a 3 level lasing system. In each instance, pumping is effected by a separate laser or lamp which emits photons of an appropriate energy which is higher than that which corresponds to the signal wavelength. The electrons are excited from the ground state to one or more pump bands which are above the upper lasing level. A pump band can comprise a multiplet state in the Stark manifold. In the case of an ion in a glass, electronic states generally are broadened into Stark split manifolds. However, the different manifold multiplet states are usually not really discrete levels at room temperature because of homogeneous broadening. Depending upon the pump frequency, the electrons are excited to a level of the upper lasing state, and this level can be above level $E_4$ of FIG. 1 and $E_3$ of FIG. 2. The electrons then decay, normally nonradiatively from this level, to the upper lasing level. It is important that the spontaneous lifetime of the upper lasing level exceed that of the pump bands by a significant margin to allow heavy population of the upper level. When a photon at the laser wavelength interacts with an excited ion in the upper lasing state, stimulated emission can occur. The photon can come from either previous spontaneous emission, stimulated emission, or an input signal. At the lower level $E_2$ of FIG. 1 and $E_1$ of FIG. 2, a similar manifold can exist. The electrons will decay to some level in the lower manifold, the level to which it decays being represented by the wavelength at which it operates i.e., 1.53 μm–1.56 μm.

The difference between the 4 level-lasing system of FIG. 1 and the 3 level lasing system of FIG. 2 is important to note. In the 3 level lasing system, the lower lasing level is either the ground state or so close to the ground state that it has a significant thermal population. In the 4 level lasing system, there is still a further transition from the lower lasing level to the ground state, and this is normally nonradiative in nature and much faster than the radiative transition. In a 3 level lasing system, absorption from the ground state directly to the upper lasing level takes place, decreasing the signal intensity and vitiating the effect of emission of lasing photons unless the ground state is depopulated by strong pumping. The significance of whether the laser is a 3 level laser system or a 4 level system lies mainly in the necessity in a 3 level lasing system to pump at a higher intensity to obtain population inversion. Thus, 3 level laser systems normally have higher values of threshold power than 4 level laser systems, especially for bulk, non-fiber active media and, therefore, 4 level laser systems are currently preferred. Rare earth doped optical fiber amplifiers operate in both 3 and 4 level modes.

Another difference between 3 and 4 level lasing systems lies in the dependence of gain on fiber length. In a 4 level system, assuming no imperfection losses, there is no point at which the gain will decrease as the fiber length is increased. In a 3 level system, there is an optimal length for which the maximum gain for a given pump power. This is an intrinsic property of a 3 level system even in the absence of imperfection losses. In an end-pumped 3 level fiber, the number of available pump photons and hence the population inversion will be greatest at the launch end and decreases monotonically along the fiber. The maximum gain for a given pump power is achieved when the fiber length is such that the pump power emerging from the other end of the fiber is exactly equal to the pump threshold power needed to achieve transparency. Every increment of the length up to that point contributes to net gain because the pump power is above the pump threshold; every increment of length beyond that point detracts from the gain because the pump power is below the threshold level for transparency and the signal experiences a net loss in that region.

Another major difference between 3 level and 4 level systems lies in the dependence of saturation output power on pump power. In a 4 level system the saturation power is independent of pump power, while in a 3 level system the saturation output power depends linearly on the pump power and can be increased by increasing the pump power.

It is clear that the operation of an optical amplifier using a 4 level system device is significantly different from that of an optical amplifier using a 3 level system.

Optical fibers doped with rare earth such as erbium to from fiber amplifiers which operate at a $\lambda = 1.53-1.56$ $\mu m$ are of particular interest for optical communications because of their low insertion loss, broad gain bandwidth (~30 nm) and polarization insensitive gain. Recent developments have demonstrated that erbium-doped fiber amplifiers can be pumped with laser diodes which operate at a pump wavelength of $\lambda_p = 1.48$ $\mu m$ or $\lambda_p = 980$ nm. It is to be noted that erbium-doped optical amplifiers are of the 3 level system type.

Figure 3:
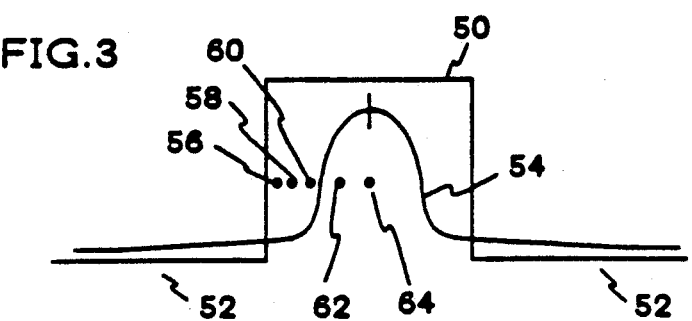
FIG. 3 is a plot of the index of refraction of an erbium-doped fiber superimposed on a plot of the intensity profile of the pump mode of prior art optical amplifier.

Presently, erbium-doped fiber amplifiers have high threshold powers which are obtained because the cores are large relative to the power mode size. Referring to FIG. 3, there is illustrated a plot of a prior art erbium-doped fiber amplifier having a high pump threshold. The center step portion 50 represents the index of refraction of the erbium-doped core of the single mode fiber and the ends 52 represent the index of refraction of the cladding of the single mode fiber. The core of the optical fiber which can be made from glass and, therefore, is referred to as the glass host is uniformly doped with the rare earth dopant erbium and the index of refraction of the core is greater than that of the cladding. The curve of the pump mode 54 of the fiber is illustratively superimposed on the plot of the index of refraction of the optical fiber. The radius of the core 50 of the erbium-doped fiber is large compared to the radius of the pump mode 54 of the fiber. Included in FIG. 3 are representative atoms 56, 58, 60, 62, 64 of erbium which may be substantially uniformly distributed across the core. In operation, erbium atoms 62 and 64 are near or at the center of the fiber and are exposed to the maximum intensity of the pump mode. Obviously they are excited from the ground state to a band which is above the upper lasing level. This, however, does not occur for those erbium atoms 56, 58 60 which are positioned near the edge of the core. From FIG. 3, it can be seen that the intensity of the mode at and near the edge of the core is substantially reduced relative to the peak value at the center of the core. In practice, this reduction may be such that the erbium atoms at the edge of the core do not see a sufficient flux of pump photons to yield a net gain. Such atoms contribute only to signal absorption which reduces the overall fiber gain experienced by the signal mode. As noted previously, in a 3 level lasing system, the lower lasing level is either the ground state or at a level so close to the ground state that it has a significant thermal population. Because the atoms of erbium 56, 58, 60 located in the low intensity area spend most of their time at the lower lasing level, not only do they not materially contribute to the gain process, but they contribute to absorption, decreasing the efficiency of the amplifier. In a 4 level system, on the other hand, atoms in the low pump region spend most of their time in the ground state which is not the lower lasing state thus they are just passive observers; they do not participate in the gain, but contrary to the case of the 3 level system, they do not absorb at the signal wavelength either and thus do not degrade the gain. In this invention the parameters of erbium doped fiber amplifiers are disclosed for obtaining optimum gain performance. In the description following: Type A is an erbium doped fiber amplifier which is compatible with a standard single mode fiber (SMF) 1.5 $\mu m$ communication fiber; Type B is an erbium doped fiber amplifier which is compatible with a standard 1.5 $\mu m$ dispersion-shifted fiber (DSF) and Type C is an erbium doped fiber amplifier which has a mode dimension which is smaller than the mode dimension of Type A or B.

In this invention, the parameters of the erbium-doped fiber amplifiers are disclosed which provide optimum gain and gain coefficient when pumped at 980 nm and 1480 $\mu m$ wavelengths.

The parameters of Type A, B and C are noted in Table 1.

TABLE I

| FIBER PARAMETERS | | | |
|---|---|---|---|
| | TYPE A | TYPE B | TYPE C |
| a ($\mu m$) | 4.5 | 3 | 1.5 |
| $\Delta n$ | 0.0035 | 0.01 | 0.03 |
| NA | 0.10 | 0.17 | 0.29 |
| $\lambda_c$ ($\mu m$) | 1.19 | 1.34 | 1.16 |
| $\omega_p^{01}$ (980 nm) ($\mu m$) | 3.27 | 2.10 | 1.1 |
| $\omega_p^{01}$ (1.47 $\mu m$) ($\mu m$) | 3.98 | 2.47 | 1.35 |
| $\omega_s^{01}$ (1.53 $\mu m$) ($\mu m$) | 4.09 | 2.53 | 1.38 |
| $\eta_{SMF}$ (dB) | <−0.05 | −1.3 | −5 |
| $\eta_{DSF}$ (dB) | −0.8 | <−0.05 | −1.5 | a = core radius
$\Delta n$ = core-cladding refractive index difference
NA = numerical aperture
$\lambda_c$ = cutoff wavelength
$\omega_p^{01}$, $\omega_s^{01}$ = pump and signal power sizes of $LP_{01}$ modes, as defined as the 1/e radius in a Gaussian mode envelope approximation
$\eta_{SMF}$ } = coupling loss between fibers of types A, B and C with SMF
$\eta_{DSF}$ } and DSF fibers, respectively.

From Type A to Type C, the core radius decreases (a = 4.5, 3, 1.5 $\mu m$) and the index difference increases ($\Delta n = 0.0035$, 0.01, 0.03), which enables mode size matching of Type 1 with single mode fiber communication fiber of Type B with dispersion-shifted fiber, and a mode size reduction to the minimal value of $\omega^{01} = 1.38$ $\mu m$ which can be achieved with an index step of $\Delta n = 0.03$. The table of fiber parameters Table 1, also shows the coupling loss $\eta_{SM}$ and $\eta_{DSF}$ between the three fiber types with SMF and DSF, respectively. These values were obtained from a Gaussian mode envelope approximation. The coupling losses are less than 0.05 dB for matching fiber types; i.e., Type A with SMF and Type B with DSF. The 5(1.5)dB coupling loss of Type C fiber with SMF(DSF) can be suppressed by use of fiber typers. The same technique can be used to match Type B with SMF and Type A with DSF.

Figure 4:
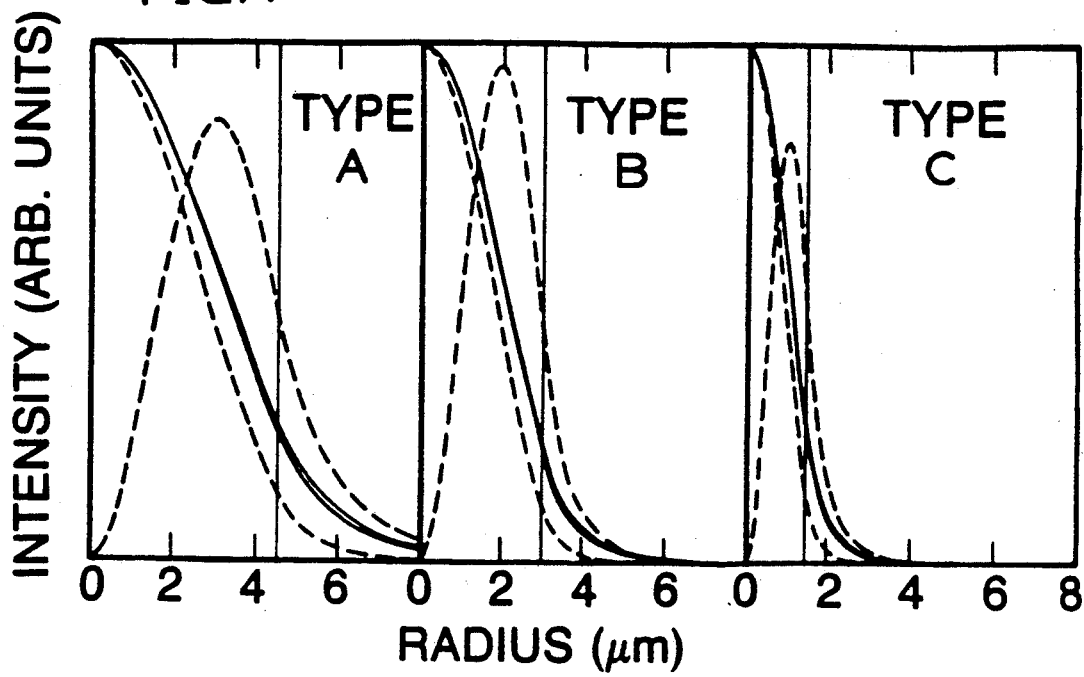
FIG. 4 illustrates power mode envelopes Vs. fiber radius for three types of fibers. The full line corresponds to $LP_{01}$ modes at $\lambda_p = 1.47$ $\mu$m and $\lambda_s{}^A = 1.531$ $\mu$m; the dash line corresponds to $LP_{01}$ and $LP_{11}$ modes at $\lambda_p = 980$ nm.

The power mode envelopes obtained from calculations see (Appl. Optics, Vol. 10, No. 10,2252 (1971); "Weakly Guiding Fibers" by D. Gloge) for the three fiber types are plotted as a function of fiber radius in FIG. 4, for $\Delta_p = 980$ nm ($LP_{01}$ and $LP_{11}$) modes, and $\lambda_p = 1.47$ $\mu m$, $\lambda_s = 1.531$ $\mu m$ ($LP_{01}$ modes). Note the increase in pump power confinement from Type A to Type C fibers. The FIG. shows that for the three fiber types the intensity decreases from its maximal value at r = 0 by a factor of four at the core-cladding interface. Thus, the situation may happen that the pump power is above threshold at the center of the fiber and falls below threshold at some point in the evanescent tail of the mode. Because of the 3-level property of the Erbium doped glass system, while the inner region of the core is inverted and has gain, the outer region that is not inverted is absorbing, resulting in inefficient pumping. This effect can be alleviated by confining the erbium doping near the center of the fiber core. For pump powers which are much higher than threshold, complete and uniform inversion can be achieved across the fiber core. In this instance, reducing the erbium doping dimension does not effect the pumping efficiency. In the case of multimode excitation at 980 nm, the null in the $LP_{11}$ mode around the fiber axis causes a reduction of the inverse in this region. When both $LP_{01}$ and $LP_{11}$ modes are excited, this effect is compensated by the fact that the $LP_{01}$ mode has the highest intensity at $r=0$. Thus, depending on the fractional excitation of the $LP_{11}$ modes, confining the erbium doping near the center may, in some cases, reduce the efficiency of the erbium-doped fiber amplifier.

The absorption and gain coefficients can be calculated. See "Gain Saturation Effects in High-Speed, Multichannel Erbium-Doped Fiber Amplifiers at $\lambda=1.53$ $\mu m$" "IEEE J. Lightwave Tech. December 1989 by E. Desurvire et al.". The cross-sections listed in Table 2 below correspond to alumino-silicate glass fibers.

TABLE 2

| Er:GLASS LASER PARAMETERS (ALUMINO-SILICATE GLASS FIBER) | |
|---|---|
| $\rho_o$ = | $1 \times 10^{19}$ cm$^{-3}$ |
| $\tau_p$ = | 10 ms |
| $\sigma_a(\lambda_p = 980$ nm$)$ = | $3.48 \times 10^{-25}$ m$^2$ |
| $\sigma_a(\lambda_p = 1470$ nm$)$ = | $1.5 \times 10^{-25}$ m$^2$ |
| $\sigma_a(\lambda_s = 1.531$ $\mu m)$ = | $5.75 \times 10^{-25}$ m$^2$ |
| $\sigma_e(\lambda_s = 1.531$ $\mu m)$ = | $7.90 \times 10^{-25}$ m$^2$ |
| $\sigma_a(\lambda_s = 1.544$ $\mu m)$ = | $3.11 \times 10^{-25}$ m$^2$ |
| $\sigma_e(\lambda_s = 1.544$ $\mu m)$ = | $5.16 \times 10^{-25}$ m$^2$ | where $\sigma_{a,e}(\lambda_{p,s})$ = are the absorption and emission cross-sections at $\lambda_{p,s}$.

For this type of erbium doped glass the gain curve has a peak at $\lambda_S{}^A=1.525$ $\mu m$ (7 nm wide) and a flat region (20 nm-wide) centered around $\lambda_S{}^B=1.544$ $\mu m$. Thus, the signal wavelengths $\lambda_S{}^A$ and $\lambda_S{}^B$ can be considered as representative signal wavelengths for the two respective gain regions of interest. The pump thresholds and saturation powers are noted below in TABLE 3.

TABLE 3

| PUMP THRESHOLDS AND SATURATION POWERS | | | |
|---|---|---|---|
| | TYPE A | TYPE B | TYPE C |
| $P_p{}^{th}$ (980 nm) (mW) | 1.96 | 0.806 | 0.222 |
| $P_p{}^{th}$ (1.47 $\mu m$) (mW) | 4.48 | 1.730 | 0.514 |
| $P^*_{sat}$ (1.531 $\mu m$) ($\mu W$) | 998 | 382 | 115 |
| $P^*_{sat}$ (1.544 $\mu m$) ($\mu W$) | 1,650 | 631 | 190 | where
$P_p{}^{th}$ = pump threshold at $\lambda_p$ as defined by:
$P_p{}^{th} = h\nu_p\pi\ (\omega_p{}^{01})^2/\sigma_a(\lambda_p)\tau)$
$P^*_{sat}$ = saturation power at $\lambda_s$ as defined by:
$(P_{sat} = 2h\nu_s\pi(\omega_s{}^{01})^2/[\sigma_a(\lambda_s) + \sigma_e(\lambda_s)]$ and $\tau$ is Er$^{3+}$ fluorescence lifetime of $^4I_{13/2}$-$^4I_{15/2}$ transition.

It is to be noted that an erbium concentration of $\rho_0=1\times 10^{19}$ ions/cm$^3$ is assumed and is only a scaling factor for erbium-doped fiber amplifier optimum lengths discussed below.

Referring to FIGS. 5-10, there is illustrated the theoretical gain curves as a function of launched pump power for the three types of fibers for the signal wavelength $\lambda_S{}^A$ and $\lambda_S{}^B$, and for the two pump wavelengths of $\lambda_p=1.47$ $\mu m$ (full lines) and $\lambda_p=980$ nm (dash lines). These curves were obtained for two values of the erbium doping confinement parameter $\epsilon$ (the ratio of erbium doping core radius to fiber radius), i.e., $\epsilon=1$ and $\epsilon=1$ and $\epsilon=0.25$. Each FIG. contains two sets of curves (one set for each pump wavelength) obtained for different optimal lengths $L_{opt}$. Each set has three curves for which the gain is maximum when the input pump power is $P_p{}^{in}=10$ mW, 20 mW or 30 mW.

Figure 5:
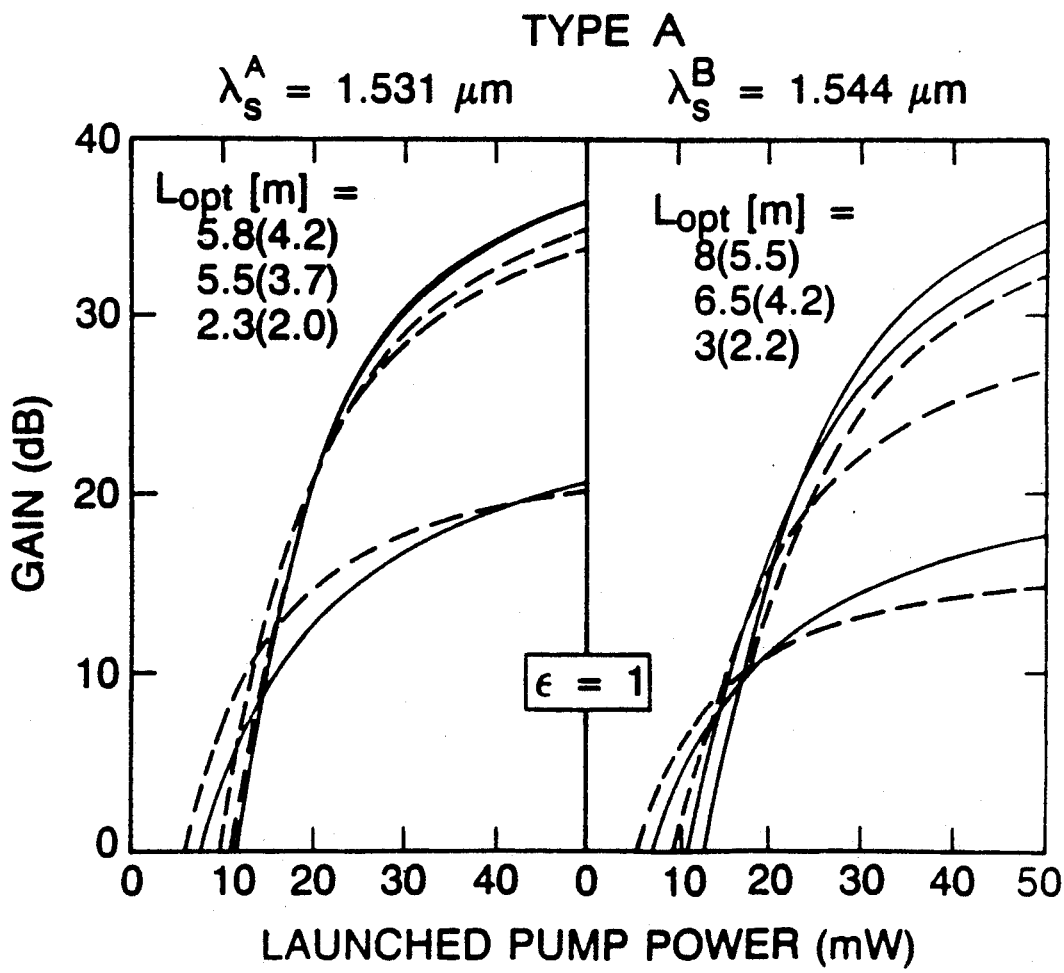
FIGS. 5 and 6 illustrate the gain at $\lambda_s{}^A = 1.531$ $\mu$m and $\lambda_s{}^B = 1.544$ $\mu$m, vs. which are typical signal wavelengths in the Erbium gain curve, launched pump power for $\epsilon = 1$ and $\epsilon = 0.25$, for Type A fiber-solid line, $\lambda_p = 1.47$ $\mu$m, and dashed line $\lambda_p = 980$ nm. The optimal lengths $L_{opt}$ correspond to maximum gains for $P_p{}^{in} = 10, 20$ and 30 mW are shown for $\lambda_p = 1.47$ $\mu$m and are in parenthesis for $\lambda_p = 980$ nm.

FIG. 5 shows that in the case where $\epsilon=1$ and in the low pump region ($P_p{}^{in}$5-20 mW), the gains at $\lambda_S{}^A$, $\lambda_S{}^B$ with 980 nm pump are higher than with 1.47 $\mu m$ pump, while in the high pump region ($P_p{}^{in}\gtrsim 20$ mW) the reverse occurs. FIG. 5 also shows that at moderately low pump powers ($P_p{}^{in}\lesssim 25$ mW) the gains of $\lambda_S{}^A$ are higher by ~5 dB than the gains at $\lambda_S{}^B$, but tend to be equal at 50 mW pump power, i.e. G ~ 36 dB. At high pump powers ($P_p{}^{in}>40$ mW), the gains with 980 nm pump are 2 to 3 dB lower than those obtained with 1.47 $\mu m$ pump. As the absorption cross-section at 980 nm is greater than at 1.47 $\mu m$ (see Table 2), and the 980 nm $LP_{01}$ mode size is smaller than that of 1.47 $\mu m$ pump, one finds $P_P{}^{th}=1.96$ mW for 980 nm pump and $P_P{}^{th}=4.48$ mW for 1.47 $\mu m$ pump (Table 3). Thus, the difference in gains, in favor of 1.47 $\mu m$ pump, is contrary to expectation. Actually, the lower pump threshold at 980 nm causes the slope of the gain curve to be steeper and the gains to be higher in the low pump regime ($P_P{}^{in}<15$ mW). At powers high above threshold, however, the medium is fully inverted and the maximum gains are determined by the optimal lengths. Because of the difference in pump absorption coefficients (980 nm being more strongly absorbed than 1.47 $\mu m$), the optimal lengths are longer for 1.47 $\mu m$ pump wavelength, which results in higher gains.

Figure 6:
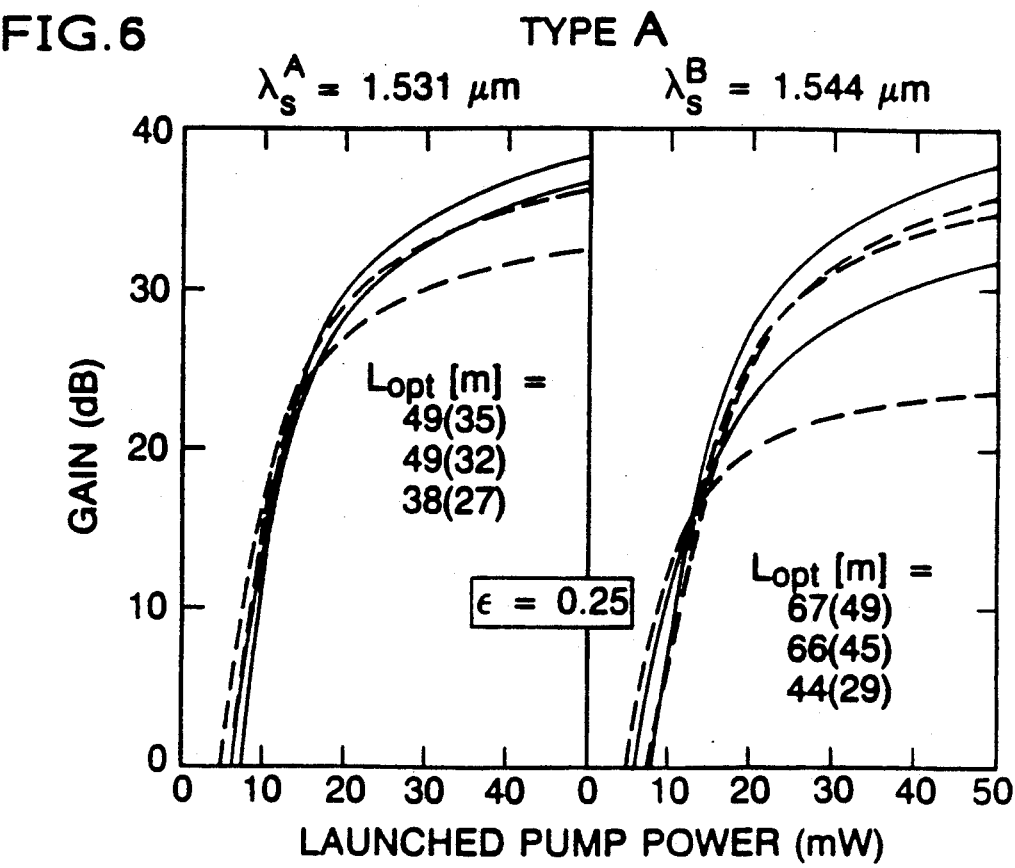
Figure 7:
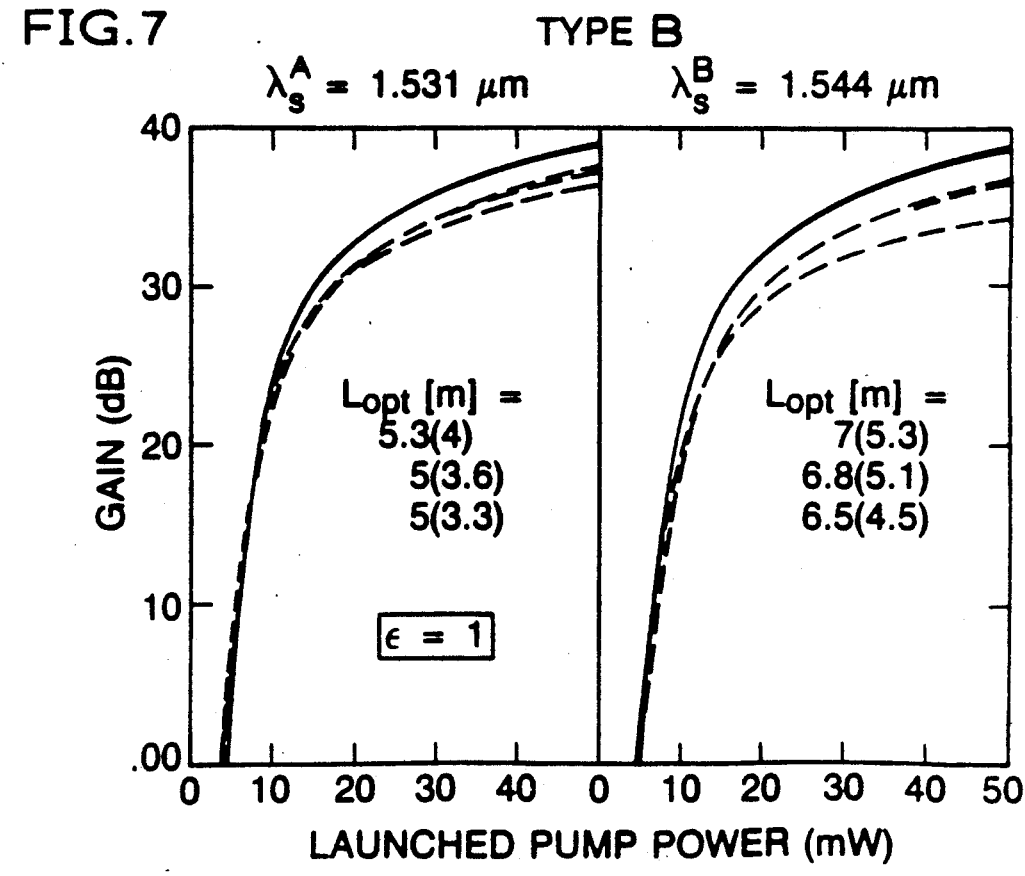
FIGS. 7 and 8 are the same as FIGS. 5 and 6 for Type B fiber.
Figure 8:
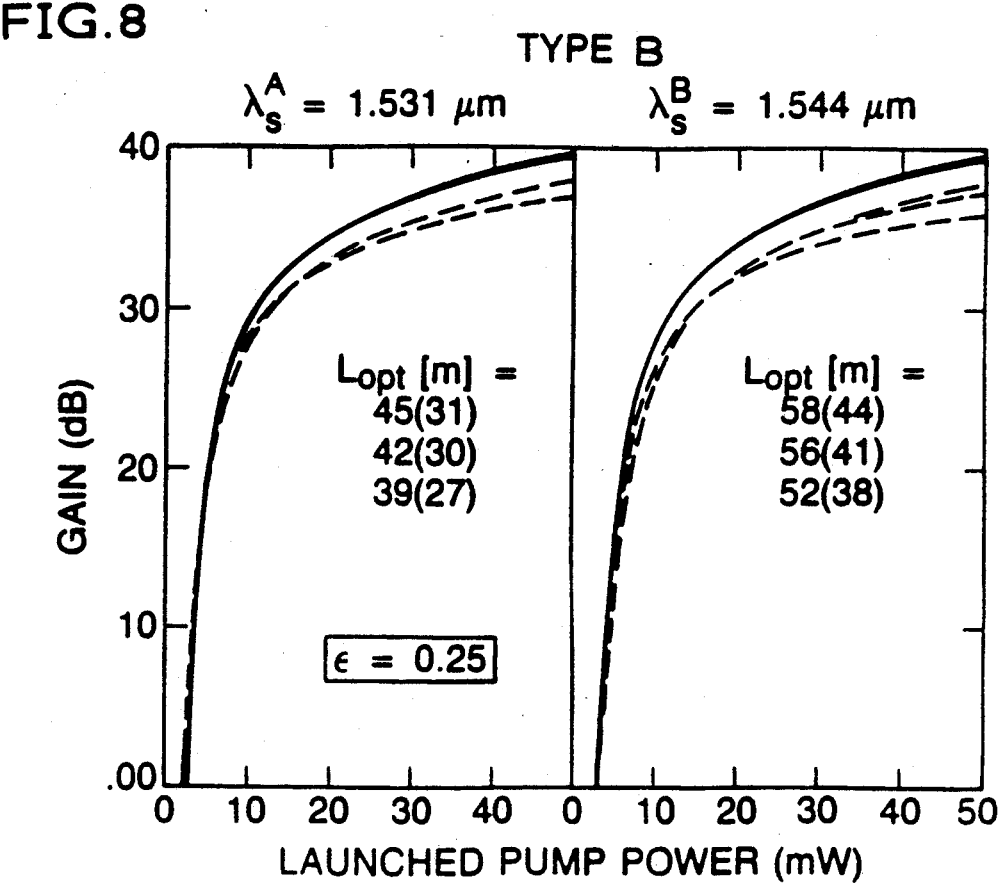

Comparison of FIGS. 5 and 6 shows the effect of confining the Er-doping near the fiber core axis. In FIG. 6, the confinement factor is set to a value of $\epsilon=0.25$. At low pump powers this reduction of $\epsilon$ results in a twofold increase in the slopes of the gain curves, and, over the whole pumping range, in an increase of the gains by 1 to 20 dB. The smallest (1 dB) increase is at high pump (50 mW). When $\epsilon=1$, a pump power of 30 mW is required for gains near 30 dB which is achieved only with the longest lengths (FIG. 5). When $\epsilon$ is reduced to 0.25, only 20 mW, are required to achieve the same gains (FIG. 6). Thus, for both pump wavelengths and both signal wavelengths considered, confinement of the Er-doping results in a sizable improvement in gains and pumping efficiencies. FIGS. 7 and 8 show the gain curves obtained for Type B waveguide where $\epsilon=1$ and 0.25, respectively. The curves of FIGS. 7 and 8, when compared to those of FIGS. 5 and 6 show that Type B fiber is more efficient than Type 1. This is expected as the two pump thresholds are lower for Type B fiber (Table 3). Actually, the gain performance of Type B with no Er-confinement ($\epsilon=1$) is similar to that of Type A fiber with Er-confinement ($\epsilon=0.25$); the maximum achievable gain for Type B waveguide (G~39 dB) is slightly higher. As for the Type A waveguide, reducing the Er-doping dimension to $\epsilon=0.25$ results also in an increase in slope efficiency and gains, although the relative change is not as important. This is because the very low pump thresholds (0.8-1.7 mW) permits near-uniform inversion from the inner region of the core to the outer region near the cladding, even at powers as low as 10 mW.

Figure 9:
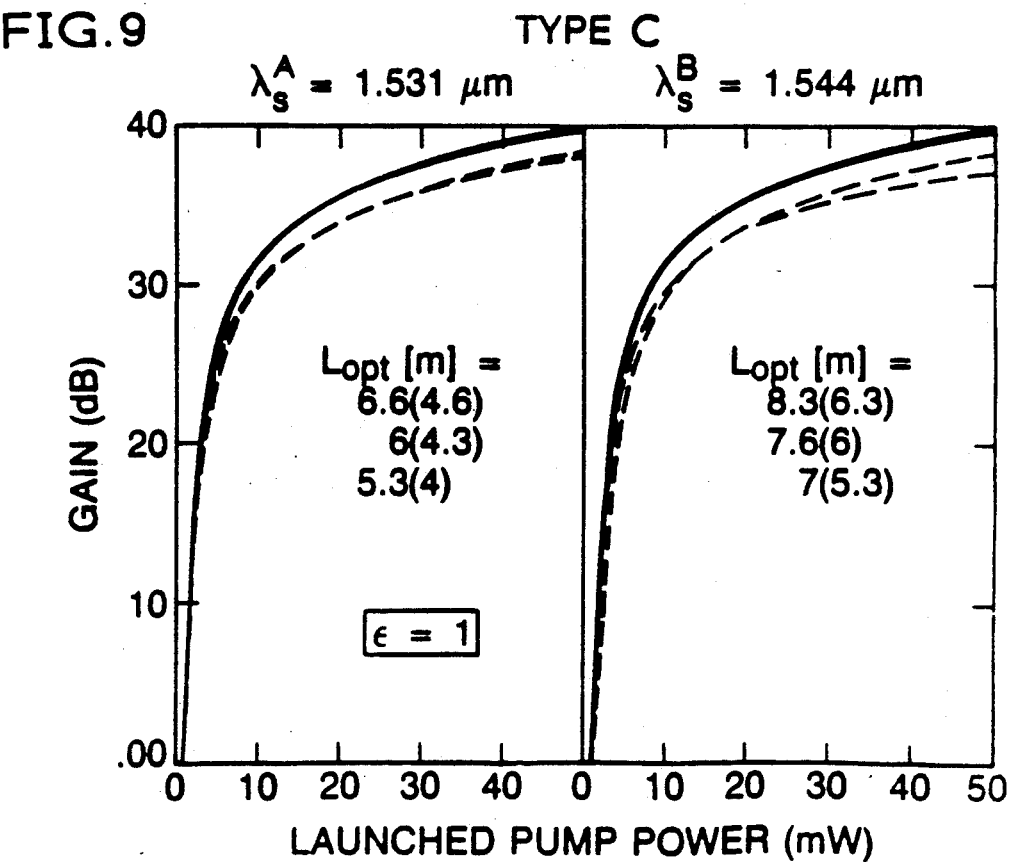
FIGS. 9 and 10 are the same as FIGS. 5 and 6 for Type C fiber.
Figure 10:
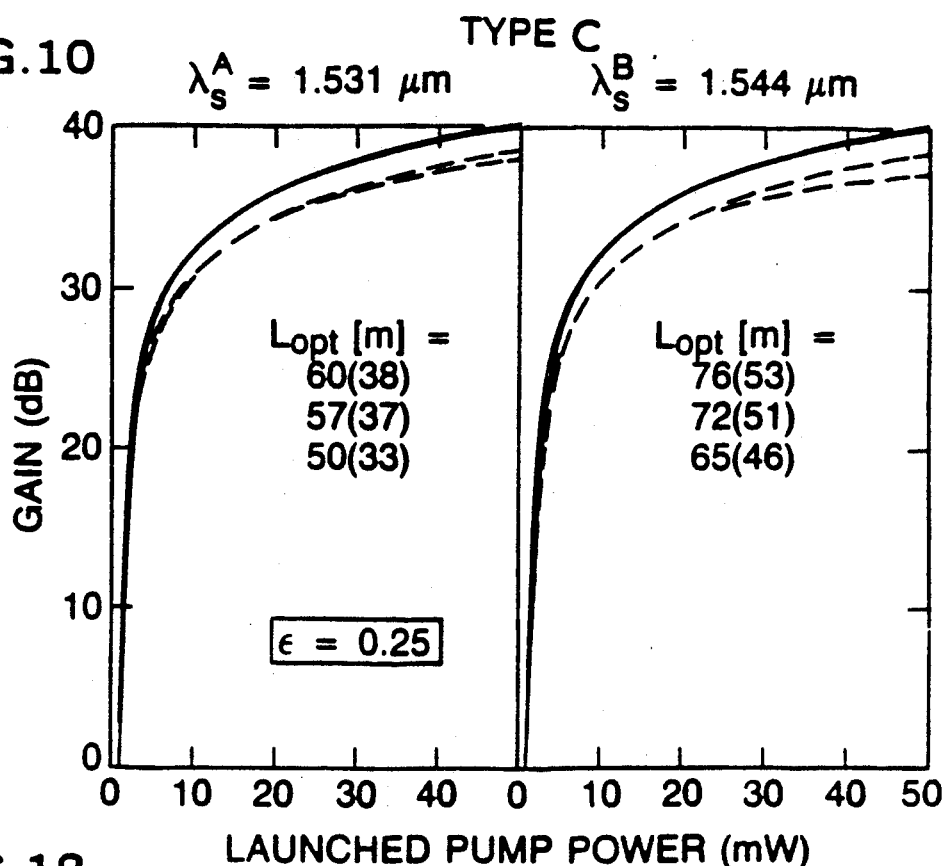

Referring to FIGS. 9 and 10, Type C fiber with $\epsilon=1$ is very similar to that of Type B fiber with $\epsilon=0.25$. The improvement introduced by reducing the erbium-core dimensions to $\epsilon=0.25$ (FIG. 10) is not significant, as in the case of Type B fiber, because of the very low values of the pump thresholds (i.e., $P_P{}^{th}=222$ mu W and 514 mu W, respectively, Table 3). For Type C fiber, a launched pump power of 5 mW corresponds to 10 to 25 times these pump thresholds, and at this high pumping rate the medium inversion is not affected by the transverse variation of pump intensity across the core. It is clear then, that the effect of confinement of the Er-doping for the pump power range considered ($P_p^{th}=0$–50 mW), is the strongest for Type A fiber which has the highest pump thresholds.

Figure 11:
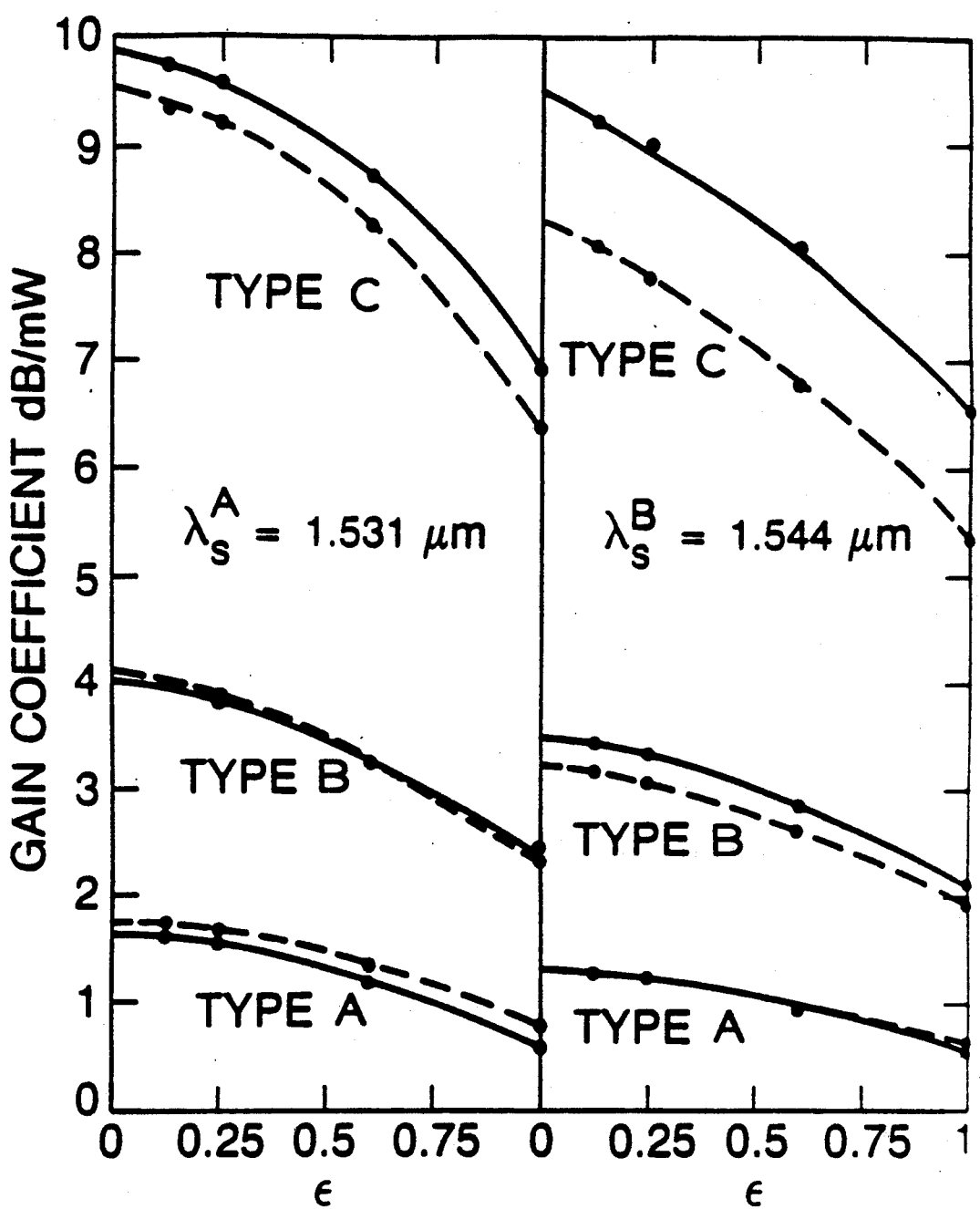
FIG. 11 illustrates calculated gain coefficient as a function of the parameter $\epsilon(\epsilon = {}^aEr/a$; Ratio of Er-doped core radius to fiber core radius) for three types of fiber, for the two signal wavelengths $\lambda_s{}^A$ and $\lambda_s{}^B$; and for the two pump wavelengths $\lambda_p = 1.47$ $\mu$m (full line) and $\lambda_p = 980$ nm (dashed line) where the input pump power is $P_p{}^{in} = 10$ mW.

The maximum ratio of gain to launched pump power, or gain coefficient, represents a figure of merit for the erbium doped fiber amplifier (EDFA). As seen from FIGS. 5–10, a high gain coefficient corresponds to the case where the erbium doped fiber amplifier gain increases rapidly at low pump powers and then tends to be nearly constant. For a Type A waveguide, this last regime is reached when $P_p^{in} \sim 50$ mW (FIGS. 5,6) and for Type C when $P_p^{in} \sim 25$ mW (FIGS. 9,10). Operation of the erbium-doped fiber amplifier in this regime, rather than at low pump power, minimizes the gain dependence with pump power fluctuations. A high gain coefficient indicates that this regime can be reached at moderately low (i.e., 25 mW) pump powers. FIG. 11 shows the gain coefficients plotted as a function of $\epsilon$ for the three fiber waveguides and for the two pump wavelengths where $P_p^{in}=10$ mW. The figure shows that reducing the erbium-doping dimension results in a gain coefficient increase, as is also shown in FIGS. 5–10. The increase is most significant when the confinement parameter is reduced from $\epsilon=1$ to $\epsilon=0.25$. Considering first the case $\epsilon=1$, the lowest gain coefficients are for the Type A waveguide, i.e., $g(\lambda_s^{A,B},\lambda_p) \approx 0.6$–0.75 dB/mW. The coefficients increase with Type B fiber ($g=2$–2.5 dB/mW) and Type C fiber ($g=5.5$–7 dB/mW) following the decrease in pump thresholds.

The difference in gain coefficients at the two pump wavelengths of 980 nm and 1.47 $\mu$m is relatively small for all three types of fibers, as shown in FIG. 11. The discrepancy in gain coefficient between the two pump wavelengths is the most important for Type C fiber at signal wavelength $\lambda_s^B$ and is at maximum about 10%. When the fiber lengths are optimized for pump powers higher than in the case of FIG. 11 ($P_p^{in}=20$–30 mW), the dependence of the gain coefficient on pump wavelength becomes much weaker, as shown by the slopes of the gain curves in FIGS. 5–10.

When the Er-doping is confined in the center of the fiber, i.e., $\epsilon \lesssim 0.25$, the best gain coefficients that can be achieved are, from FIG. 11: $g=1.5\pm0.2$ dB/mW (Type A), $g=3.7\pm0.3$ dB/mW, (Type 2) and $g=9\pm0.75$ dB/mW (Type C). The range given for all these values accounts for the change in gain coefficients with pump and signal wavelengths. Note that the case $\epsilon \to 0$ is a mathematical limit and has no physical meaning, as the optimal lengths are infinite in this case. As shown in the figure, the increase of gain coefficients due to the erbium doping confinement to $\epsilon \lesssim 0.25$ corresponds to improvements of about a factor of two for Types A and B fibers. The improvement is less ($\sim 1.5$ times) for Type C fiber which has very low pump thresholds (Table 3) and for which inversion across the core is not dependent in the transverse pump intensity profile.

Figure 12:
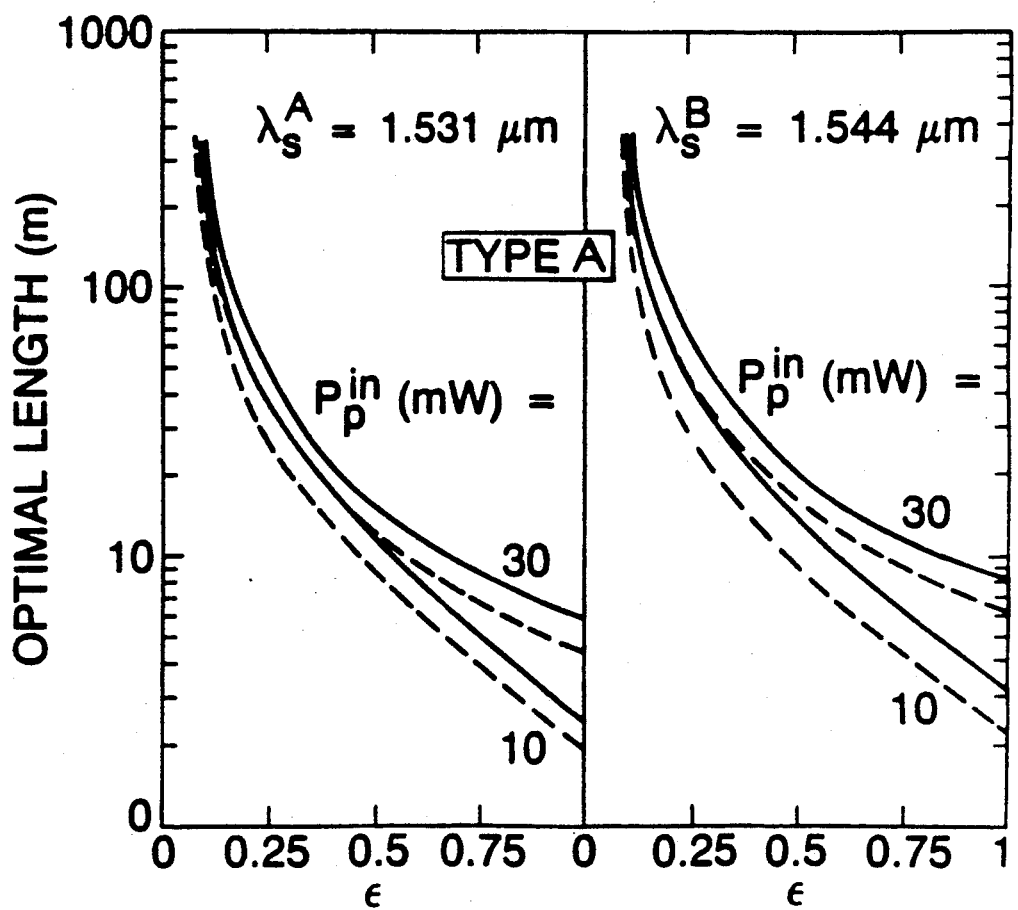
FIG. 12 illustrates optimal lengths for Type A fiber as a function of parameter $\epsilon$, at the two signal wavelengths $\lambda_s{}^A$, $\lambda_s{}^B$, for input pump power $P_p{}^{in} = 10$ mW and 30 mW, and for $\lambda_p = 1.47$ $\mu$m (full line) and $\lambda_p = 980$ nm (dash line).

When the Er-doping is concentrated near the center of the core, the overlap between the pump and signal modes with the corresponding active region is reduced, and consequently the pump absorption rate and the signal gain coefficient are also reduced. Thus, when the Er is confined to the center of the core, longer fiber lengths are required. The length that maximizes the gain for a given launched pump power is referred to as the optimal length $L_{opt}$. FIG. 12 shows $L_{opt}$ as a function of the Er-confinement parameter $\epsilon$, for Type A fiber and the two signal wavelengths $\lambda_s^A$, $\lambda_s^B$ and for two values of the pump power, i.e., $P_p^{in}=10$ or 30 mW. For $\epsilon=1$, the optimum lengths are longer at $\lambda_s^B$ than at $\lambda_s^A$, which is expected as the fluorescence cross-sections satisfy $\sigma_e(\lambda_s^B) < (\lambda_s^A)$. As $\epsilon$ tends to small values, the optimum length $L_{opt}$ increases: the rate of increase approximates an inverse quadratic law in $\epsilon$, i.e., $L_{opt}(\epsilon_2)/L_{opt}(\epsilon_1) \approx (\epsilon_1/\epsilon_2)^2$, which is consistent with the decrease of the core mode interaction area. The ranges of optimum lengths for Type 1 fiber at $P_p^{in}=30$ mW, also shown in FIGS. 5, 6, are: $L_{opt}(\epsilon=1)=2$–3 m, and $L_{opt}(\epsilon=0.25)\approx 27$–44 m. Thus, for Type 1 waveguide, the improvement in gain coefficient due to the confining of Er-doping up to $\epsilon=0.25$ which was discussed above, necessitates an increase in fiber lengths of about one order of magnitude. Further confinement ($\epsilon \approx 0.1$) brings the optimal lengths in the 100 m range, as shown in FIG. 12. This condition may not be practical for applications of erbium doped fiber amplifiers as lumped amplifier devices. For applications requiring distributed gains, however, for which $L_{opt} \approx 10$–100 km, FIG. 12 shows that more erbium-doping confinement is actually necessary ($\epsilon << 0.1$). The high slope of the $L_{opt}$ versus $\epsilon$ curves near the original imposes tight constraints on the precision of the confinement parameter $\epsilon$ and the concentration $\rho$, if the optimal length $L_{opt}$ must be accurately defined.

Figure 13:
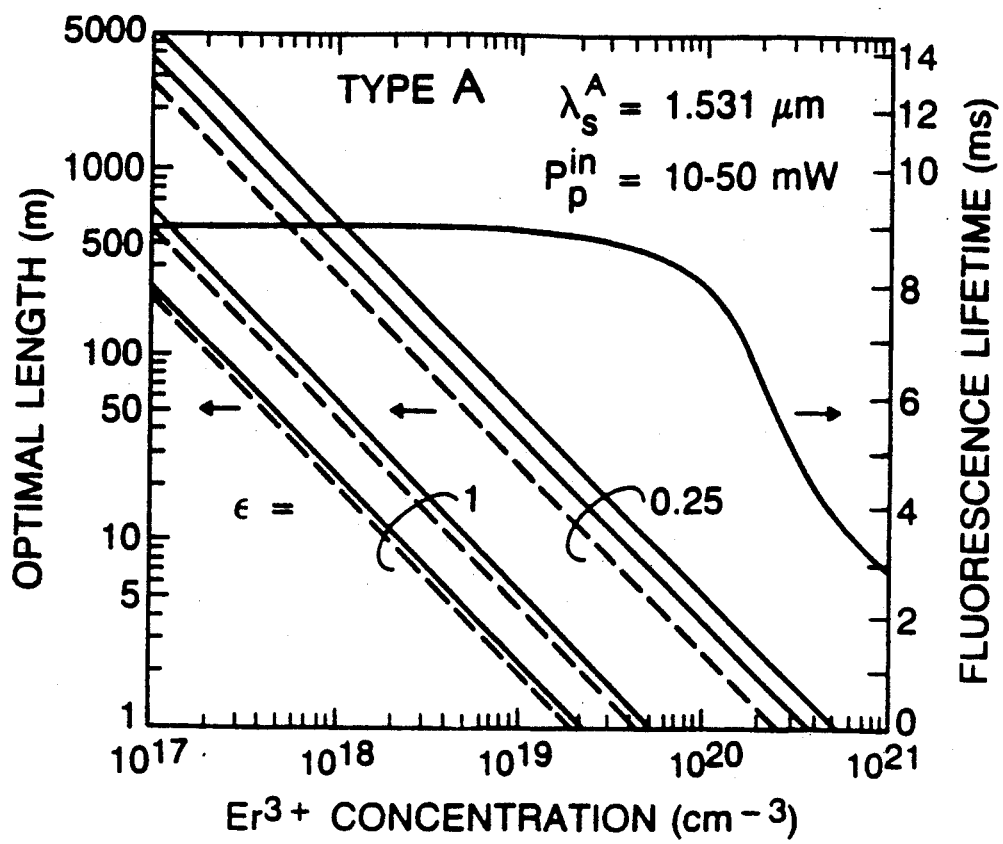
FIGS. 13 and 14 illustrate optimal length $L_{opt}$ as a function of $Er^{3+}$ concentration for Type A (FIG. 13) and Type C (FIG. 14) fiber, and two values of parameters $\epsilon = 1$ and 0.25. Solid lines illustrate the range of $L_{opt}$ at $\lambda_p = 1.47$ $\mu$m when pump power varies from $P_p{}^{in} = 0$ to 50 mW, and dash lines for the $\lambda_p = 980$ nm case. The fluorescence lifetime $\tau$ Vs. Er concentration is also plotted in the FIGS. 13, 14.
Figure 14:
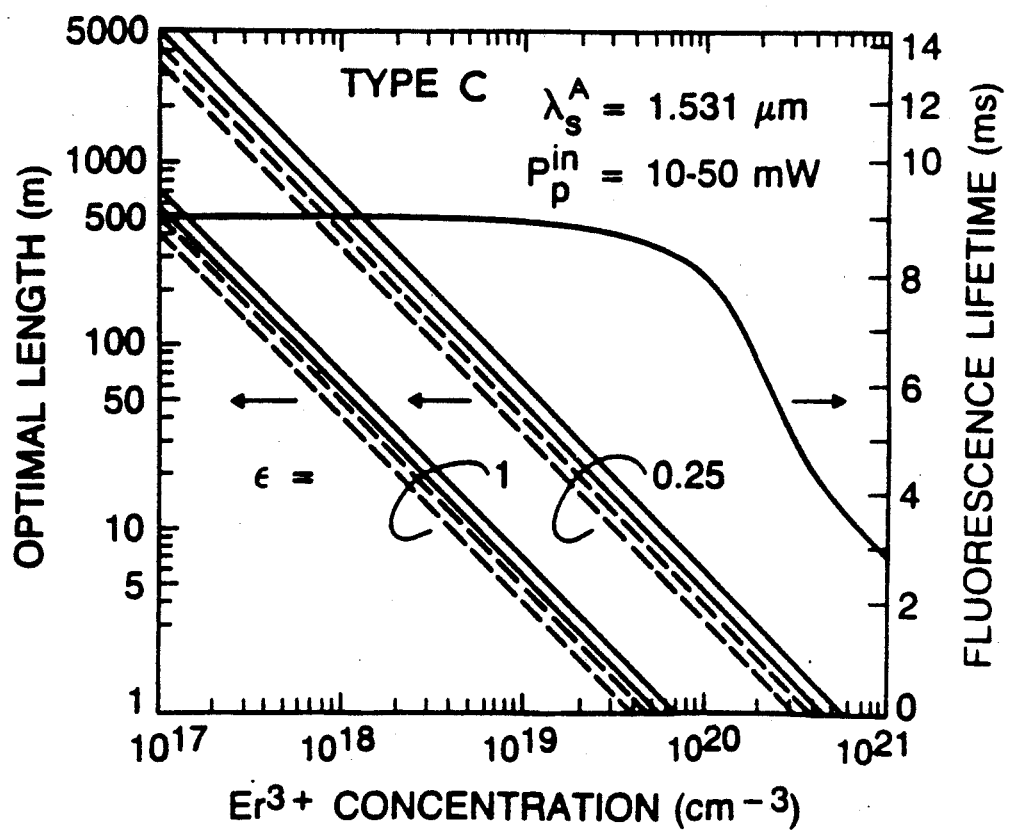

It is important to evaluate at this point the range of optimal lengths $L_{opt}$ corresponding to the values of the confinement parameter $\epsilon$, to the range of launched pump power $P_p^{in}$ and to the range of $Er^{3+}$ concentration $\rho_o$. FIGS. 13 and 14 show plots of optimal lengths vs. $Er^{3+}$ concentration $\rho_o$ for $\epsilon=1$ or 0.25, $P_p^{in}=10$ or 50 mW, $\lambda_p=980$ nm (dashed lines) or 1.47 $\mu$m (full lines) and Types A and C fibers. Also plotted in the figure is the $Er^{3+}$ fluorescence lifetime $\tau$ as a function of $Er^{3+}$ concentration, corresponding to a silicate glass. This last curve shows a fluorescence quenching effect or decrease of the fluorescence lifetime when the concentration is increased beyond $\rho_o=1\times 10^{19}$ ions/cm$^3$. This effect is known to be due to cooperative up-conversion which is detrimental to signal amplification. Assuming this curve to be typical of all types of silica glasses, the value of $\rho_o=1\times 10^{19}$ cm$^{-3}$ can be considered in practical applications as an upper limit for the Er concentration. For smaller concentrations $\rho_o^1$, the optimal length $L_{opt}(\rho_o^1)$ is given by $$L_{opt}(\rho_o^1) = \frac{\rho_o}{\rho_o^1} L_{opt}(\rho_o) \qquad \text{(Equation 1)}$$

because the erbium doped fiber amplifier gain (in dB) is proportional to the $Er^{3+}$ concentration (see IEEE J. Lightwave Technology, Dec., 1989 "Gain Saturation Effects in High-Speed Multichannel Erbium-Doped Fiber Amplifier at $\lambda=1.53$ $\mu$m" by E. Desurvire, et al). The straight lines describing $L_{opt}(\rho)$ in FIGS. 13, 14 are determined by the points corresponding to the optimal lengths $L_{opt}(\rho_o)$ calculated with $\rho_o=1\times 10^{19}$ cm$^3$ and the linear law in Eq. (1). It is clear from FIGS. 13, 14 that the simultaneous conditions $\rho_o \lesssim 1 \times 10^{19}$ cm$^{-3}$ and $\epsilon=0.25$ set a lower bound $L_{opt}^{min}$ for the optimal lengths. For Type A, the minimum lengths is $L_{opt}^{min}=$-

25-55 m, and for Type C $L_{opt}^{min} = 35$–65 m. These two ranges of $L_{opt}^{min}$ cover the pumping powers of 10 to 50 mW and the two pump wavelength cases. When $\epsilon = 0.25$, the optimized lengths are about ten times longer than in the $\epsilon = 1$ case. For applications using the $\lambda_p = 980$ nm pump, excessively long fiber lengths ($L_{opt} \gtrsim 100$ m) may not be desirable, as the Rayleigh scattering at this wavelength can cause additional adsorption (a few dB/km). In the $\lambda_p = 1.47$ μm case, however, this type of loss can be as low as 0.2 dB/km, which allows longer optimal lengths (L~1-10 km). Thus, for this reason or for device design considerations, the maximum length may be limited, for instance, to $L_{opt} \lesssim L_{opt}^{max}$ 100 m. In this case, the possible concentrations $\rho_o$, from curves in FIGS. 13,14 must satisfy the condition $\rho_o \gtrsim 0.5 \pm 0.2 \times 10^{18}$ cm$^{-3}$ ($\epsilon = 1$), or $\rho_o \gtrsim 3.5 \pm 1.5 \times 10^{18}$ cm$^{-3}$ ($\epsilon = 0.25$), the margins accounting for the ranges of pump powers (10–50 mW) and choice of pump wavelengths (980 nm or 1.47 μm). These margins correspond to about $\pm 40\%$ variation of the nominal concentrations $\rho_o = 0.5 \times 10^{18}$ cm$^{-3}$ and $3.5 \times 10^{18}$ cm$^{-3}$. It is clear that if the operating pump power and pump wavelengths are fixed a priori, the Er$^{3+}$ concentration $\rho_o$ and relative Er-doping dimensions ($\epsilon$) must be even more accurately controlled during the fiber fabrication. Note that the optimal length changes from Type A to Type C fibers are not significant, as seen by comparing FIG. 13 with FIG. 14. Thus, FIGS. 13,14 can be regarded as representing the values of $L_{opt}$ for any design of Er-doped fiber amplifiers. Note that in the gain saturation regime, the optimal lengths that maximize the gains differ somewhat from those of unsaturated conditions.

Increasing the core-cladding refractive index difference of the fiber results in an optical fiber amplifier which has increased gain coefficient. It has been determined that a fiber having a core-cladding refractive index difference at least as high as 0.05 has a very high gain coefficient. In one embodiment, a high performance erbium-doped fiber amplifier in accordance with the principles of the invention, when pumped at 1.48 μm, has a gain coefficient of 5.9 dB/mW and, when pumped at 0.972 μm has an approximately equal gain coefficient of 6.1 dB/mW.

The erbium doped fiber amplifier was pumped either by a NaCl F-center laser for the 1.47-1.48 μm pump wavelength or by a Ti:sapphire laser for the 0.972-0.980 μm pump wavelength. The single mode signal source was either a tunable external cavity laser or a distributed feedback laser.

Figure 15:
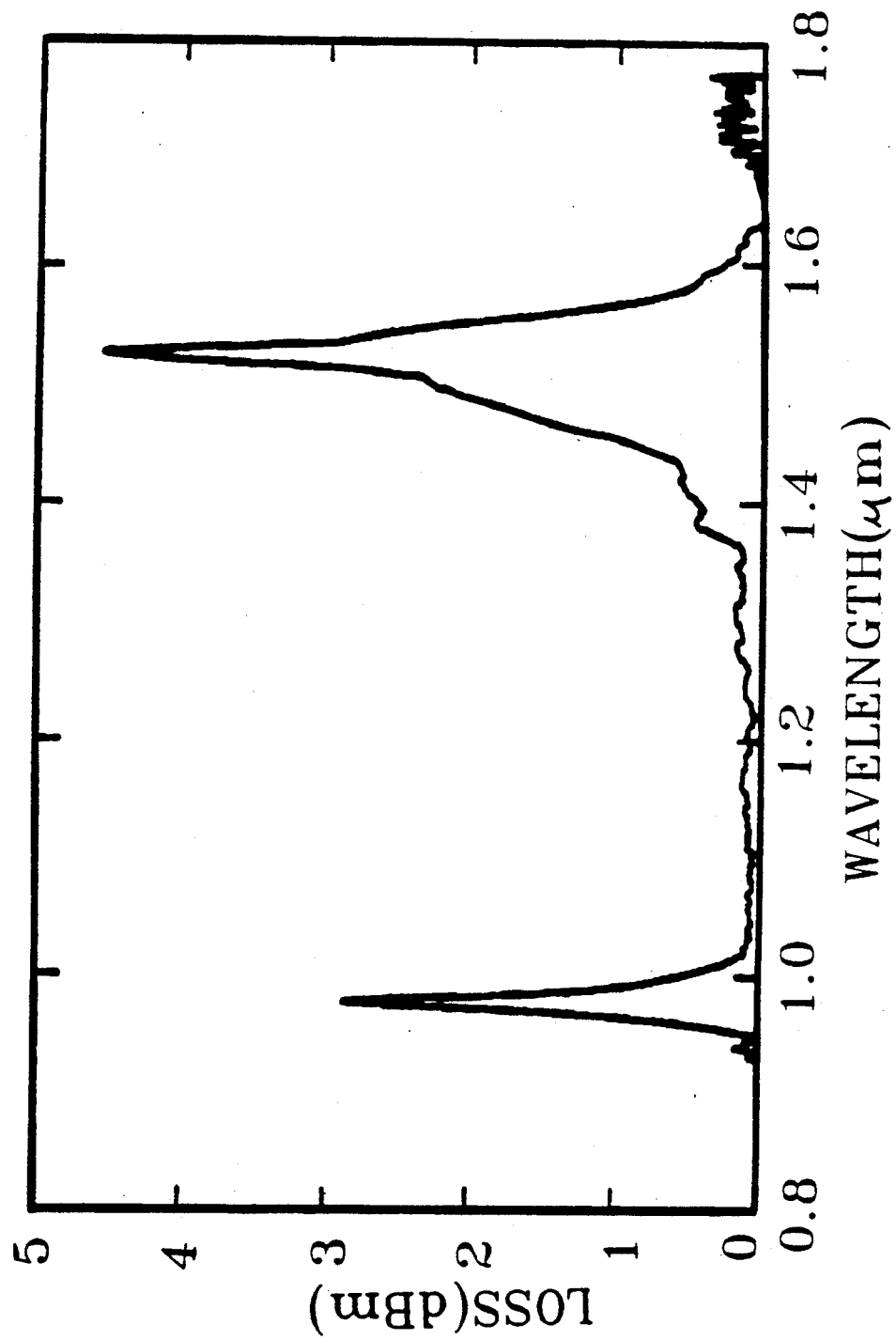
FIG. 15 illustrates the loss spectrum measured for 1.72 m length of erbium-doped fiber having a core-cladding refractive index difference of substantially 0.04.

The erbium-doped fiber has a cut-off wavelength of 1.02 μm and the Er concentration is substantially 200 ppm. The matched index cladding is silica doped with F and P and Er-doped core is co-doped with Ge and Al. In this embodiment, the core-cladding refractive index difference of the fiber is substantially 0.04. The loss curve of the fiber is illustrated in FIG. 15. The losses at the wavelength of interest are 1.64 dB/mW at 1.48 μm, 4.48 dB/m at 1.533 μm and 2.38 dB/m at 1.552 μm.

Figure 16:
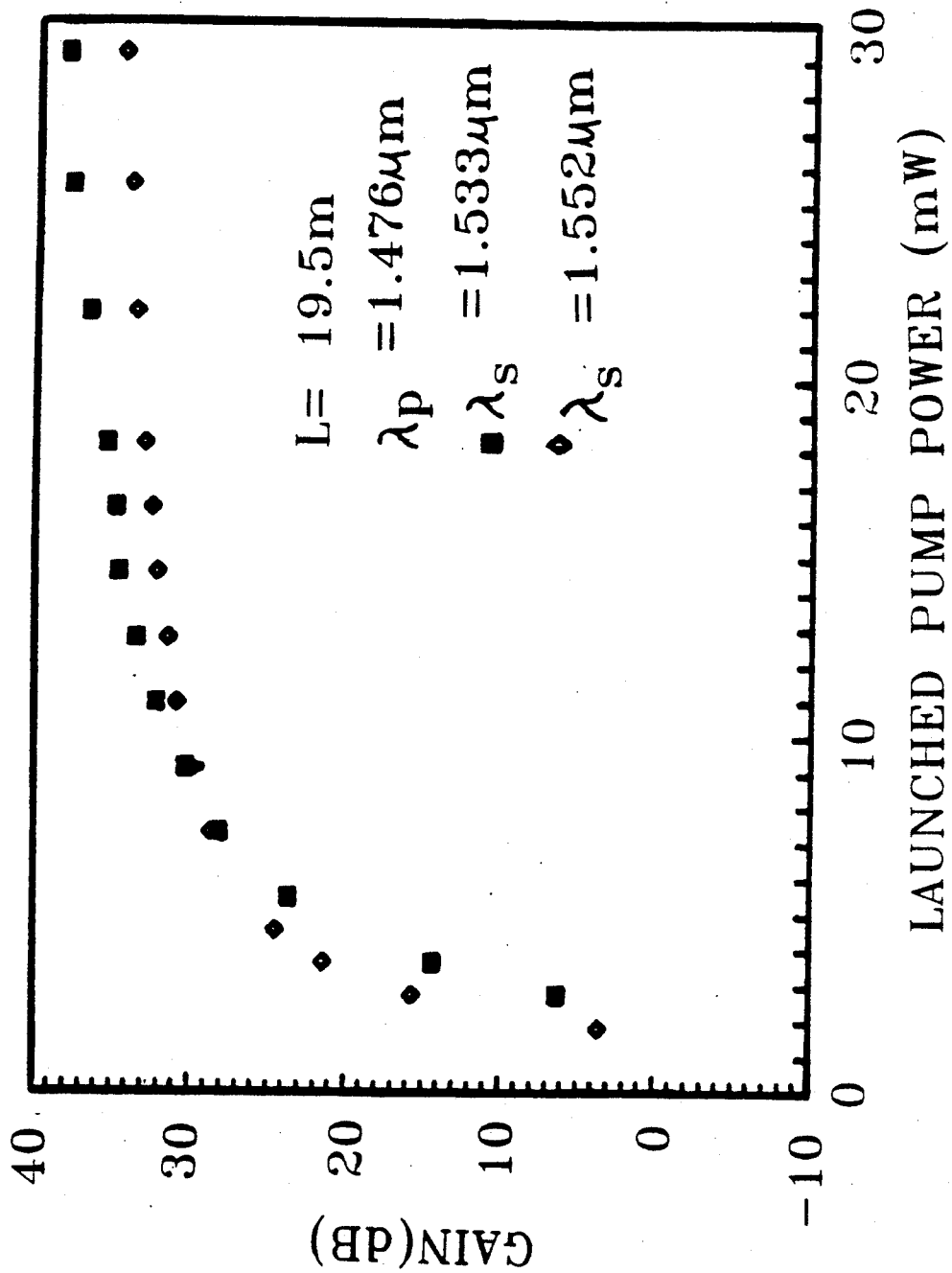
FIG. 16 illustrates gain as a function of launched pump power for a fiber 19.5 m in length having a core-cladding refractive index difference of substantially 0.04 and pumped at $\lambda_p = 1.476$ μm.

The gains for $\lambda_p = 1.48$ μm are shown in FIG. 16 as a function of pump power. The two signal wavelength, 1.533 μm and 1.552 μm, correspond to the two peaks of the gain spectrum. The fiber length is 19.5 m. For the short signal wavelength the gain coefficient is 4.3 dB/mW corresponding to 24 dB of gain at 5.5 mW of pump power. Approximately 2.5 mW of pump are required to reach transparency for this length of fiber. For the long signal wavelength the gain coefficient is 5.9 dB/mW corresponding to 21 dB of gain for 3.6 mW of pump power. In this case transparency is achieved with approximately 1.7 mW of pump power.

For a 7.3 m long fiber the transparency threshold is only 0.9 mW at $\lambda_s = 1.552$ μm and $\lambda_p = 1.48$ μm, however, the gain coefficient is lower (3.7 dB/mW) because of the lower maximum gain at high pump power (about 15 dB).

Figure 17:
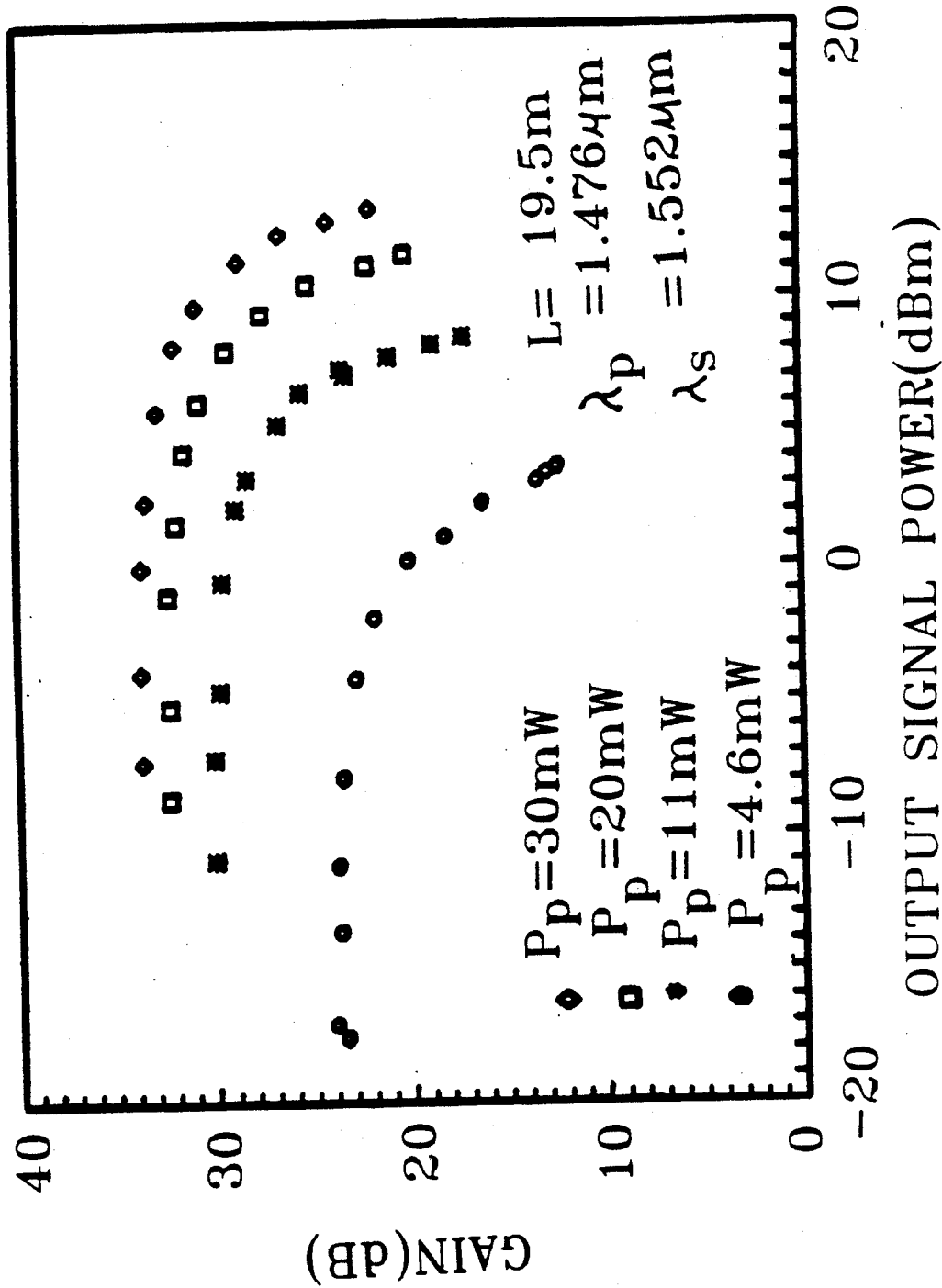
FIG. 17 illustrates gain as a function of output signal power and indicated pump powers for $\lambda_s = 1.533$ μm and $\lambda_p = 1.476$ μm. The fiber length is 19.5 m and the core-cladding refractive index difference of substantially 0.04.
Figure 18:
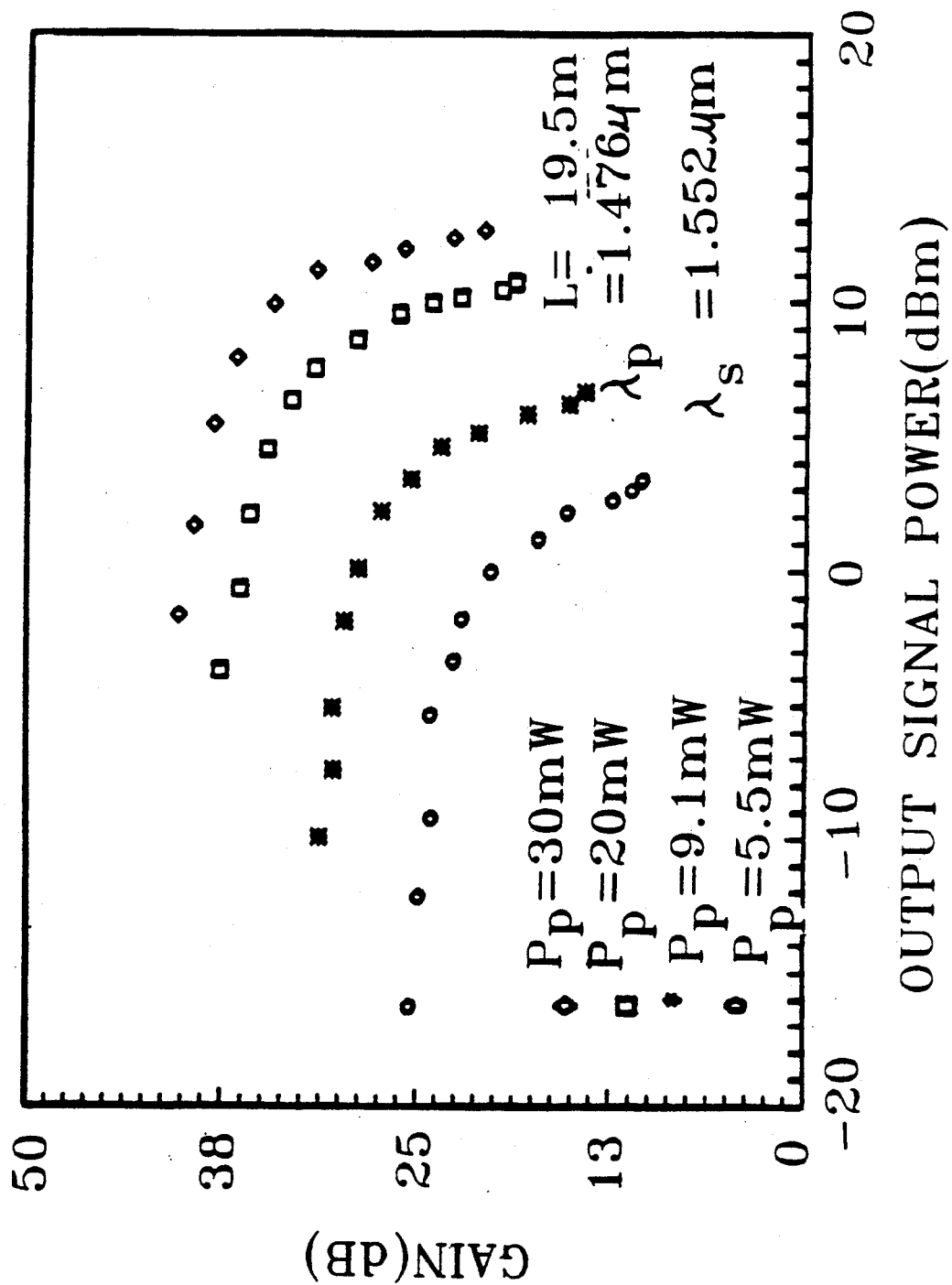
FIG. 18 illustrates gain as a function of output signal power and indicated pump powers for $\lambda_s = 1.552$ μm and $\lambda_p = 1.476$ μm. The fiber length is 19.5 m and the core-cladding refractive index difference is substantially 0.04.

The saturation characteristics are shown in FIGS. 17 and 18 for signals of wavelength 1.533 μm and 1.552 μm, respectively. The amplifier length is 19.5 m and $\lambda_p = 1.48$ μm. The saturation output power $P_{sat}^{out}$, (for 3 dB gain compression) is higher for the longer signal wavelength reflecting the lower fluorescence cross section. Because of the very low transparency threshold and the high slope efficiency for this amplifier, the gain curve reaches the flat high gain region at low pump powers. This is a necessary condition for efficient extraction of pump light in high gain erbium-doped fiber amplifiers. As a result, significant power can be extracted even at very low pump power; for the longer signal wavelength $P_{sat}^{out} = -0.7$ dBm at 4.6 mW and $P_{sat}^{out} = 4.8$ dBm at 11 mW, corresponding, respectively, to 18% and 27% of the launched pump power.

Figure 19:
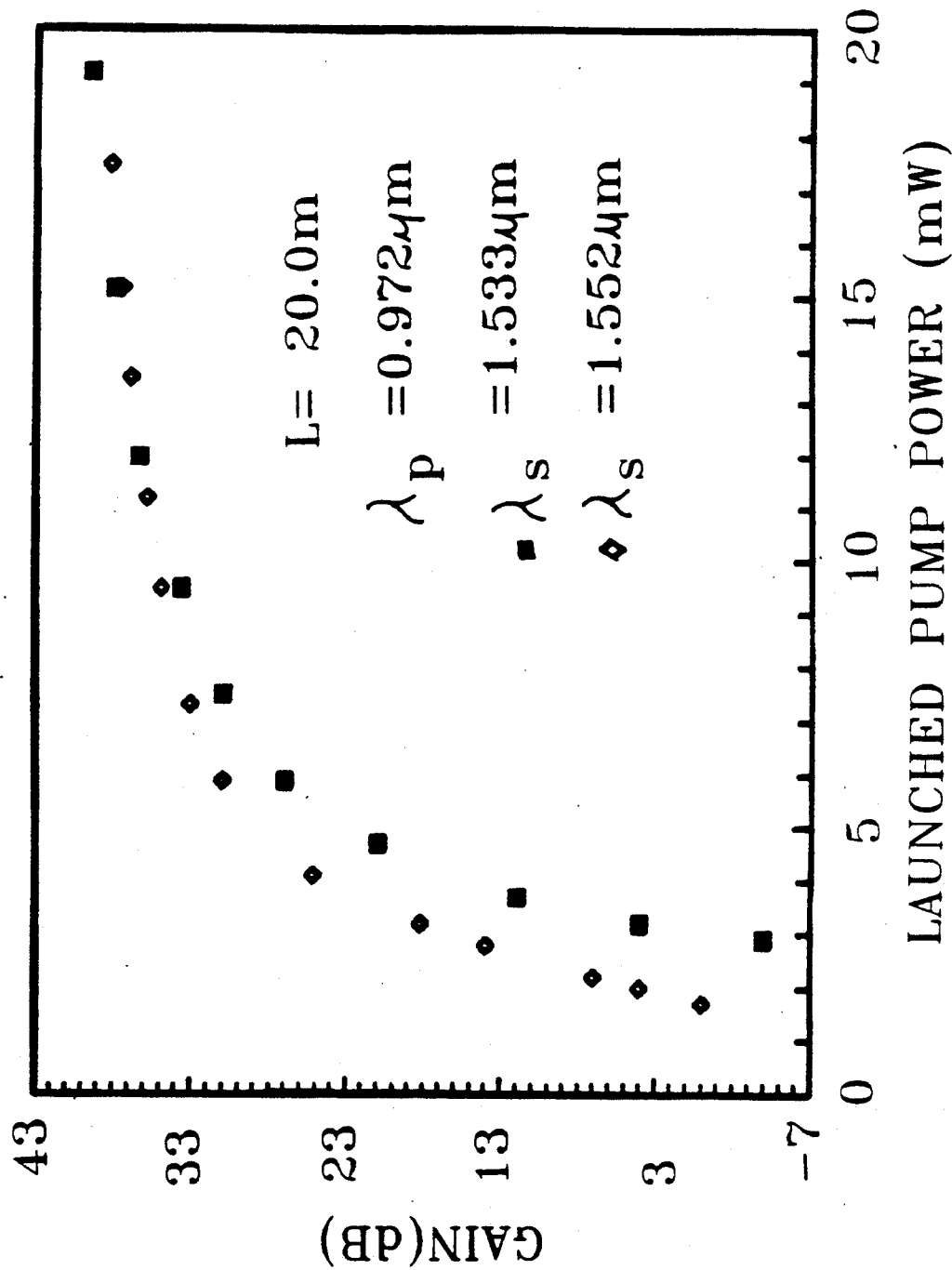
FIG. 19 illustrates gain as a function of launched pump power for a fiber 20 m in length pumped at $\lambda_p = 0.972$ μm and having a core-cladding refractive index difference of substantially 0.04.

FIG. 19 shows the gain as a function of pump power when the pump wavelength is 0.972 μm. The fiber amplifier is 20 m in length. The gain coefficients are 4.5 dB/mW at $\lambda_s = 1.533$ μm and 6.1 dB/mW at $\lambda_s = 1.552$ μm, approximately equal to the values obtained at a pump wavelength of 1.48 μm.

The optical fiber amplifier described above where the core-cladding refractive index difference is substantially 0.04 has gain characteristics for both 1.48 μm and 0.97 μm pumping with extremely low pump requirements for high gain operation. The threshold for transparent transmission of 1.552 μm signals through a short amplifier was measured to be 0.9 mW of $\lambda_p = 1.48$ μm pump light. For a long, high gain amplifier, the maximum gain coefficient is 5.9 dB/mW and high amplified signal power ($P_{sat}^{out} = 4.8$ dBm) can be generated with only 11 mW of pump power. For $\lambda_p = 0.972$ μm, the maximum gain coefficient is 6.1 dB/mW.

We claim:

1. An optical amplifier comprising a single mode optical fiber having a core surrounded by a cladding, said core being doped with Er$^{3+}$ ions having a distribution profile, said optical amplifier being adapted to be coupled to receive a pump signal of substantially 1.47 μm wavelength and having a power mode radius of substantially between 2 μm and 1 μm, the core-cladding refractive index difference of said fiber being within the range which is substantially equal to or greater than 0.025.

2. The optical amplifier of claim 1 wherein said core-cladding refractive index difference is substantially 0.025 or greater and substantially equal to or less than 0.03.

3. The optical amplifier of claim 1 wherein said core-cladding refractive index difference is substantially equal to 0.03.

4. An optical amplifier comprising a single mode optical fiber having a core surrounded by a cladding, said core being doped with Er$^{3+}$ ions having a distribution profile, said optical amplifier being adapted to be coupled to receive a pump signal of substantially 980 nm wavelength and having a power mode radius of substantially between 2 μm and 1 μm, the core-cladding refractive index difference of said fiber being within the range which is substantially equal to or greater than 0.025.

5. The optical amplifier of claim 4 wherein said core-cladding refractive index difference is substantially 0.025 or greater and substantially equal to or less than 0.03.

6. The optical amplifier of claim 5 wherein said core-cladding refractive index difference is substantially equal to 0.03.

7. The optical amplifier of claim 1 where the ratio of the $Er^{3+}$ ion doped core radius relative to the fiber core radius is within a range which is substantially equal to or less than 1 and substantially equal to or greater than 0.25.

8. The optical amplifier of claim 4 wherein the ratio of the $Er^{3+}$ ion doped core radius relative to the fiber core radius is within a range which is substantially equal to or less than 1 and substantially equal to or greater than 0.25.

9. The optical amplifier of claim 7 or 8 wherein said value of said ratio of the $Er^{3+}$ ion doped core radius relative to the fiber core radius is less than 1 and said concentration of $Er^{3+}$ ions in said core is in arrange of from $10^{17}$ ions/$cm^{-3}$ through $10^{20}$ ions/$cm^{-3}$, and said optical fiber has a length which is in a range of from 500 meters through 1 meter.

10. The optical amplifier of claim 7 or 8 wherein said value of said ratio of core radius relative to the fiber core radius is substantially equal to said concentration of $Er^{3+}$ ions in said core is within a range which extends from $10^{17}$ ions/$cm^3$ through $10^{20}$ ions/$cm^3$, and said optical fiber has a length which is within a range which extends from 5 km through 5 meters.

11. An optical amplifier for use in an optical communication system comprising a single mode optical fiber having a core surrounded by a cladding, said core being doped with $Er^{3+}$ ions, the ratio of the $Er^{3+}$ doped core radius to the fiber core radius being within a range which is substantially equal to or less than 1 and equal to or greater than 0.25, said optical amplifier being adapted to be coupled to receive a pump signal of between 1 milliwatts and 50 milliwatts at a wavelength of substantially 1.47 $\mu$m, a power mode radius substantially equal to or less than 2 $\mu$m, the concentration of $Er^{3+}$ ions in the core of said fiber being within a range of from $10^{17}$ ions/$cm^3$ to $10^{20}$ ions/$cm^3$, and the refractive index difference between the core and the cladding being within a range which extends from substantially 0.025 through 0.05, and the optical fiber has a length of between 500 meters and 1 meters.

12. An optical amplifier for use in an optical communication system comprising a single mode optical fiber having a core surrounded by a cladding, said core being doped with $Er^{3+}$ ions, the ratio of the $Er^{3+}$ doped core radius to the fiber core radius being within the range which extends from 1 through 0.25, said optical amplifier being adapted to be coupled to receive a pump signal of between 1 milliwatts and 50 milliwatts at a wavelength of substantially 980 nm, and a power mode radius substantially equal to or less than 2 $\mu$m the concentration of $Er^{3+}$ ions in the core of said fiber being with a range which extends from $10^{17}$ ions/$cm^3$ to $10^{20}$ ions/$cm^3$, and the refractive index difference between the core and the cladding being within a range which extends from substantially 0.025 through 0.05 and the optical fiber has a length of between 500 meters and 1 meter.

13. An optical amplifier comprising a single mode optical fiber having a core surrounded by a cladding, said core being doped with $Er^{3+}$ ions having a distribution profile, said optical amplifier being adapted to be coupled to receive a pump signal of substantially 1.47 $\mu$m wavelength and having a power mode radius of substantially between 2 $\mu$m and 1 $\mu$m, the core-cladding refractive index difference of said fiber being within the range which is substantially equal to or greater than 0.03.

14. The optical amplifier of claim 13 wherein said core-cladding refractive index difference is substantially equal to or greater than 0.03 and substantially equal to or less than 0.05.

15. The optical amplifier of claim 13 wherein said core-cladding refractive index difference is substantially 0.04.

16. An optical amplifier comprising a single mode optical fiber having a core surrounded by a cladding, said core being doped with $Er^{3+}$ ions having a distribution profile, said optical amplifier being adapted to be coupled to receive a pump signal of substantially 980 nm wavelength and having a power mode radius of substantially between 2 $\mu$m and 1 $\mu$m, the core-cladding refractive index difference of said fiber being within the range which is substantially equal to or greater than 0.03.

17. The optical amplifier of claim 16 wherein said core-cladding refractive index difference is substantially 0.03 or greater and substantially equal to or less than 0.05.

18. The optical amplifier of claim 17 wherein said core-cladding refractive index difference is substantially equal to 0.04.

19. The optical amplifier of claim 13 where the ratio of the $Er^{3+}$ doped core radius relative to the fiber core radius is within a range which is substantially equal to or less than 1 and substantially equal to or greater than 0.25.

20. The optical amplifier of claim 16 wherein the ratio of the $Er^{3+}$ ion doped core radius relative to the fiber core radius is within a range which is substantially equal to or less than 1 and substantially equal to or greater than 0.25.

21. The optical amplifier of claim 19 or 20 wherein said value of said ratio of the $Er^{3+}$ ion doped core radius relative to the fiber core radius is less than 1 and said concentration of $Er^{3+}$ ions in said core is in a range of from $10^{17}$ ions/$cm^{-3}$ through $10^{20}$ ions/$cm^{-3}$, and said optical fiber has a length which is in a range of from 500 meters through 1 meter.

22. The optical amplifier of claim 19 or 20 wherein said value of said ratio of core radius relative to the fiber core radius is substantially equal to 0.25, said concentration of $Er^{3+}$ ions in said core is within a range which extends from $10^{17}$ ions/$cm^3$ through $10^{20}$ ions/$cm^3$, and said optical fiber has a length which is within a range which extends from 5 km through 5 meters.

* * * * *

UNITED STATES PATENT AND TRADEMARK OFFICE
CERTIFICATE OF CORRECTION

PATENT NO.: 5,027,079
DATED: June 25, 1991
INVENTOR(S): Emmanual Desurvire, Clinton R. Giles, John L. Zyskind It is certified that error appears in the above-identified patent and that said Letters Patent is hereby corrected as shown below:

Column 10, line 68, remove " - " at the end of the line.

Signed and Sealed this

Twenty-first Day of September, 1993

*Attest:*

BRUCE LEHMAN

*Attesting Officer*   *Commissioner of Patents and Trademarks*